(12) United States Patent
Oppici

(10) Patent No.: US 11,198,530 B2
(45) Date of Patent: Dec. 14, 2021

(54) METHOD AND SYSTEM FOR PACKAGING PACKAGES

(71) Applicant: A.C.M.I.—SOCIETA' PER AZIONI, Fornovo di Taro (IT)

(72) Inventor: Giorgio Oppici, Rubbiano di Solignano (IT)

(73) Assignee: A.C.M.I—SOCIETA' PER AZIONI, Fornovo di Taro (IT)

( * ) Notice: Subject to any disclaimer, the term of this patent is extended or adjusted under 35 U.S.C. 154(b) by 34 days.

(21) Appl. No.: 16/797,013

(22) Filed: Feb. 21, 2020

(65) Prior Publication Data

US 2020/0270008 A1    Aug. 27, 2020

(30) Foreign Application Priority Data

Feb. 22, 2019    (IT) .................. 102019000002563

(51) Int. Cl.
| | |
|---|---|
| *B65B 11/00* | (2006.01) |
| *B65B 35/24* | (2006.01) |
| *B65B 35/36* | (2006.01) |
| *B65B 35/40* | (2006.01) |
| *B65B 35/50* | (2006.01) |
| *B65B 35/52* | (2006.01) |
| *B65B 13/02* | (2006.01) |
| *B65G 47/26* | (2006.01) |
| *B65G 57/03* | (2006.01) |

(52) U.S. Cl.
CPC .............. *B65B 35/50* (2013.01); *B65B 11/00* (2013.01); *B65B 13/02* (2013.01); *B65B 35/24* (2013.01); *B65B 35/36* (2013.01); *B65B 35/405* (2013.01); *B65B 35/52* (2013.01); *B65G 47/261* (2013.01); *B65G 57/03* (2013.01); *B65G 2201/0244* (2013.01); *B65G 2203/0233* (2013.01)

(58) Field of Classification Search
CPC ....... B65B 11/00; B65B 13/02; B65B 21/245; B65B 27/04; B65B 35/30; B65B 35/36; B65B 35/405; B65B 35/44; B65B 35/50; B65B 35/52; B65G 57/03; B65G 57/32
USPC .................................. 53/447, 537, 540, 541
See application file for complete search history.

(56) References Cited

U.S. PATENT DOCUMENTS

| | | | | |
|---|---|---|---|---|
| 2,822,932 A | * | 2/1958 | Patrick ................... | B65G 57/24 414/790.7 |
| 3,201,912 A | * | 8/1965 | Wozniak ................... | B65B 5/06 53/495 |
| 3,455,085 A | * | 7/1969 | McIntyre ................ | B65B 35/50 53/153 |

(Continued)

FOREIGN PATENT DOCUMENTS

DE    102016121574 A1    5/2018

*Primary Examiner* — Stephen F. Gerrity
(74) *Attorney, Agent, or Firm* — Browdy and Neimark, LLC

(57) ABSTRACT

Herein described is a system and method for packaging packages (C), comprising the steps of: forming a row of packages (C) advancing, one following the other, along a pre-set advancement direction (A), picking up at least two first packages (C) from the row, superimposing each of said first packages (C) on a respective second package (C) of the row, releasing each of the first packages (C) resting on the respective second package (C), obtaining at least two stacks of packages, each of which comprises at least two mutually superimposed packages (C) and stabilising the stacks of packages (C).

11 Claims, 6 Drawing Sheets

(56) References Cited

U.S. PATENT DOCUMENTS

| | | | | |
|---|---|---|---|---|
| 3,777,445 | A | * | 12/1973 | Anderson ........... B65B 69/0033 53/397 |
| 4,646,908 | A | * | 3/1987 | Gambetti ............... B65G 57/32 198/418 |
| 4,917,229 | A | * | 4/1990 | Korkowski ............ B65G 57/32 198/418.4 |
| 4,986,409 | A | * | 1/1991 | Alexander ............. B65G 57/32 198/418.4 |
| 5,412,923 | A | | 5/1995 | Lashyro |
| 8,967,942 | B2 | * | 3/2015 | Torsten ................ B65G 57/303 414/789.3 |
| 2012/0014774 | A1 | * | 1/2012 | Biggel .................. B65B 35/246 414/789.2 |
| 2013/0220772 | A1 | * | 8/2013 | Vasse ................... B65G 47/841 198/431 |
| 2015/0136564 | A1 | * | 5/2015 | Hurni ..................... B65B 35/44 198/418 |
| 2017/0217612 | A1 | * | 8/2017 | Bonnain ............... B65B 21/183 |

\* cited by examiner

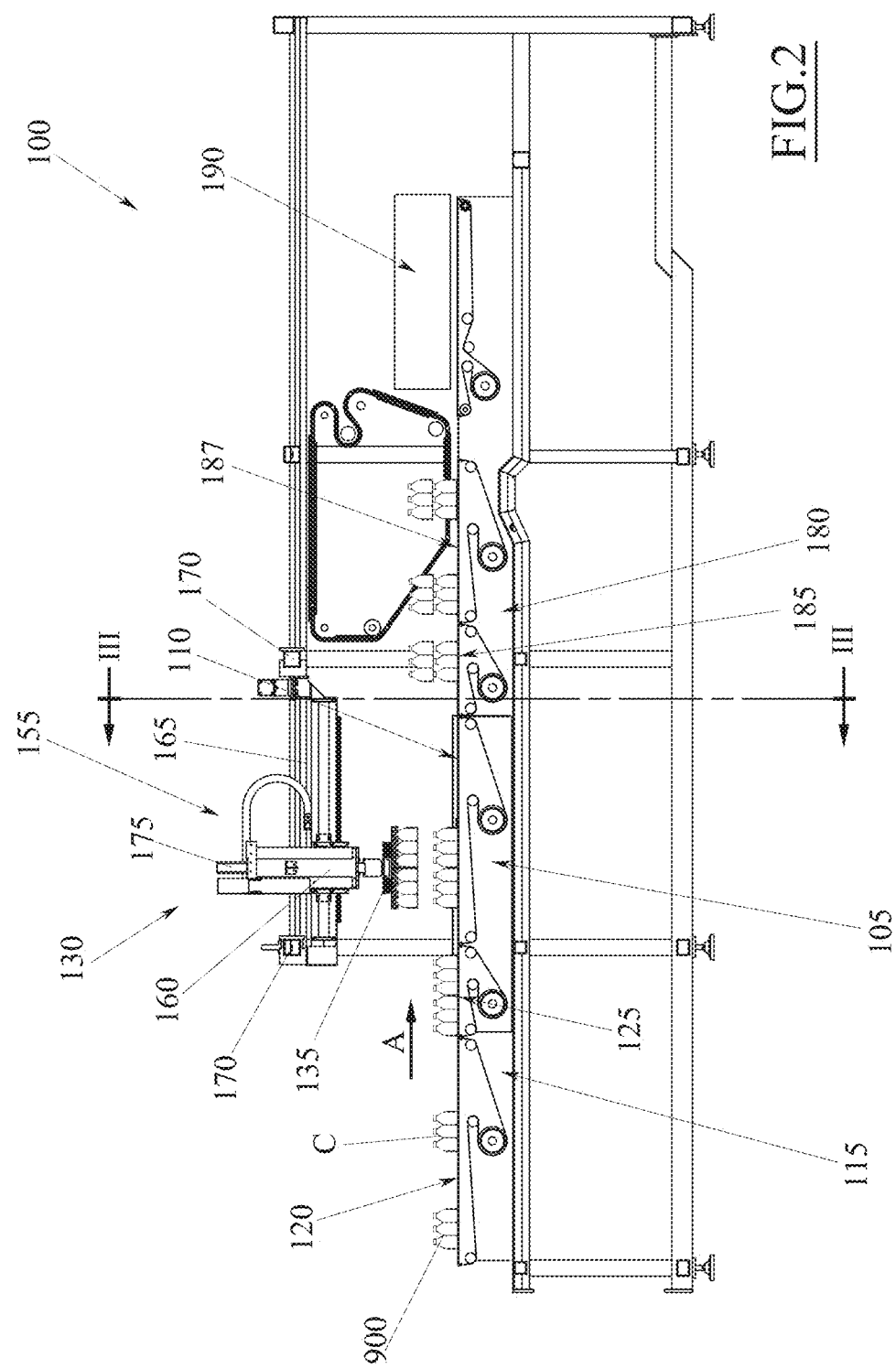

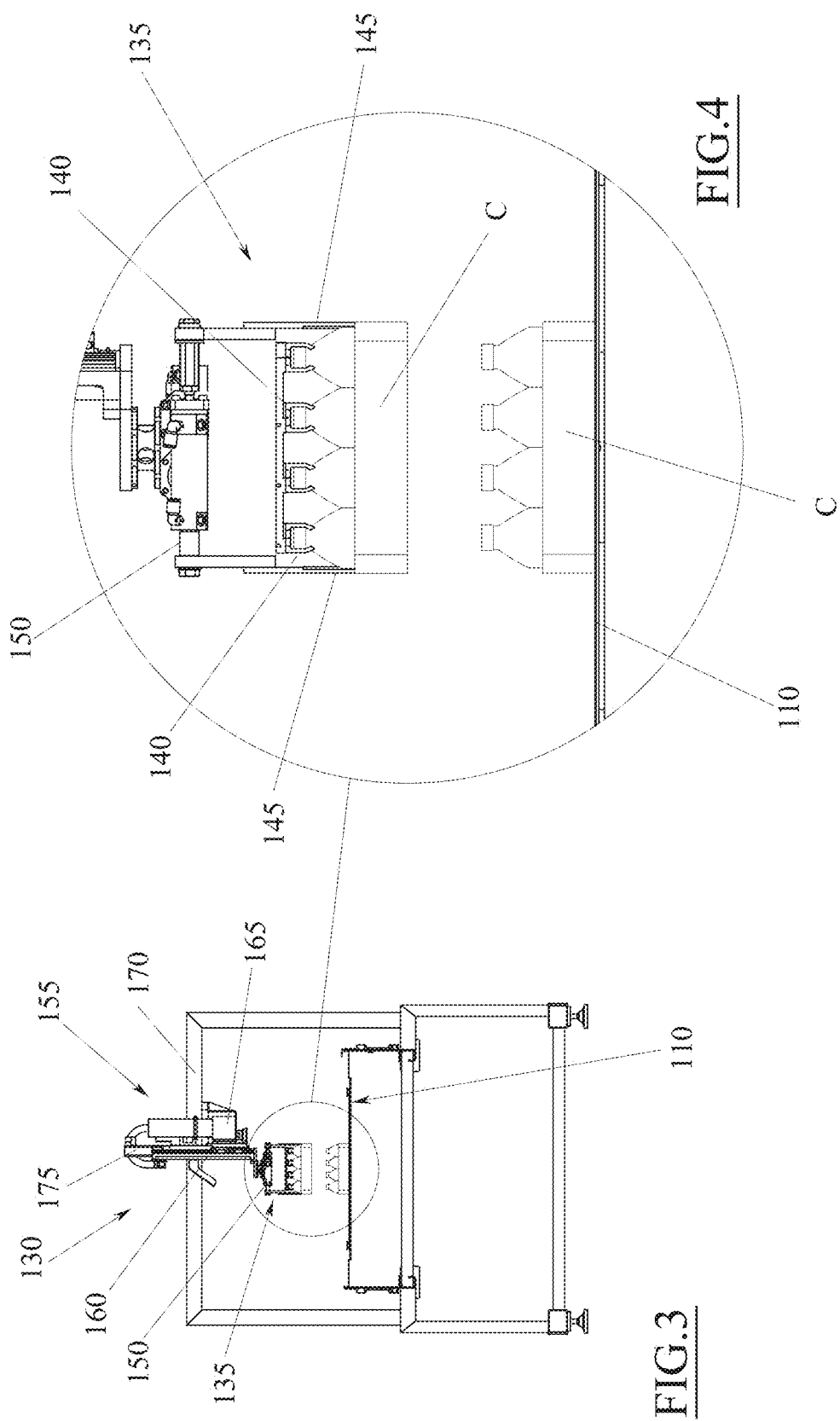

METHOD AND SYSTEM FOR PACKAGING PACKAGES

FIELD OF THE ART

The present invention regards a method and a machine for packaging packages, for example but not exclusively for packaging bottle packages.

STATE OF THE ART

Packaging some types of objects, for example small bottles, in packages each comprising a plurality of objects arranged adjacent and coplanar to each other, is known.

These packages are at times sold in groups, where each group comprises a stack consisting of at least two packages mutually superimposed and packaged together.

In order to obtain this type of packages, known are automatic machines suitable to receive the packages which advance, one after the other, along a pre-set advancement direction, to cyclically superimpose the first package of the row on the immediately subsequent one to form a stack, and lastly to stabilise the pack using a plastic film.

The machines thus conceived are certainly functional but they reveal the drawback of having a relatively low productivity, in that the step for stacking packages must be repeated for each single pair of consecutive packages of the row.

DESCRIPTION OF THE INVENTION

In light of the above, an object of the present invention is to improve and increase the productivity of the process for packaging packages like the ones outlined above.

Another object is that of attaining the aforementioned object through a solution that is simple, rational and relatively inexpensive.

These and other objects are attained by the characteristics of the invention, which are outlined in the independent claims. The dependent claims outline preferred and/or particularly advantageous aspects of the invention.

In particular, an embodiment of the present invention provides a method for packaging packages, for example but not exclusively bottle packages, comprising the steps of:
  forming a row of packages advancing, one following the other, along a pre-set advancement direction,
  picking up at least two first packages from the row,
  superimposing each of said first packages on a respective second package of the row,
  releasing each of the first packages resting on the respective second package, obtaining at least two stacks of packages, each of which comprises at least two mutually superimposed packages, and
  stabilising the stacks of packages.

Thanks to this solution, the steps that allow the stacking of the packages, i.e. the pick-up, superimposition and release steps can be effectively carried out jointly, or simultaneously or at the same time, for at least two packages at a time.

Thus, with a single sequence of these operations, it is advantageously possible to obtain at least two stacks of packages, instead of only one as it occurs with the prior art.

Thus, a method according to the invention substantially allows doubling the productivity of the packaging system.

A preferred aspect of the invention provides for that the first packages, i.e. the ones that are picked up from the row, are consecutive to each other.

The expression consecutive is used to indicate that the packages are arranged directly one after the other along the row, without any other package being interposed between them.

In this manner, the step for picking up said first packages is easier and simpler. Coherently, it is also preferable that the second packages, i.e. the ones on which the first packages are superimposed and subsequently released, be consecutive with respect to each other.

In this manner, the superimposition and releasing steps are simple.

According to another aspect of the invention, the steps for superimposing and releasing the first packages may occur while the second packages advance in the advancement direction.

Thanks to this solution it is possible to obtain a continuous process with very few downtimes.

In this context, it is also preferable that the second packages be positioned following (behind) the first packages with respect to the advancement direction of the row.

For example, the second packages can be immediately consecutive to the first packages.

According to an embodiment of the invention, the method may also comprise a preliminary step of grouping the packages of the rows into groups, where each group comprises at least two packages that are consecutive and arranged close to each other along the advancement direction.

The expression arranged close to each other is used to indicate that the distance that separates two consecutive packages belonging to the same group is smaller than the distance that separates two consecutive groups, i.e. the distance that separates the last package of a group and the first package of the immediately subsequent group (still with respect to the advancement direction).

For example, the packages belonging to the same group can be at mutual contact, while each group can be separated from the subsequent one by a non-zero distance along the advancement direction.

Coherently with this embodiment, the pick-up, superimposition and release steps can provide for:
  picking up a first group of packages from the row,
  superimposing said first group of packages on a second group of packages of the row, and
  releasing the first group of packages on the second group of packages, thus obtaining at least two stacks of packages arranged close to each other along the advancement direction and each comprising at least two mutually stacked packages.

This aspect of the invention has the advantage of simplifying and further quickening the handling of the packages that are stacked.

According to an aspect of this embodiment, the method may comprise the subsequent step of separating the obtained stacks of packages, moving them away from each other along the advancement direction.

As regards the step of stabilising the stacks, it is used to generally indicate a step aimed at mutually blocking the packages that form the stacks, substantially obtaining blocks that can be processed and handled as a whole.

An aspect of the invention for example provides for that the stabilisation step can include the operation of at least partially wrapping the stacks of packages using a plastic film, for example using an extensible and/or heat-shrinkable plastic film.

In this manner, it is advantageously possible to obtain a stabilising cover that holds the packages of the stack together, thus allowing an easy handling thereof and possibly protecting them.

However, it cannot be ruled out that the stabilisation step can be obtained through any other system suitable to mutually constrain the packages of the stacks, for example by means of strapping or taping.

According to a preferred aspect of the invention, the stabilisation step can be carried out for each stack of packages individually.

In other words, it is preferable that the packages of each stack be blocked against each other but left separated from the packages of the other stacks.

However, it cannot be ruled out that, in other embodiments, several stacks of packages can be stabilised together.

Another embodiment of the present invention provides a machine for packaging packages, comprising:
- a conveyor apparatus suitable to advance a row of packages, one after the other, along a pre-set advancement direction,
- a handling apparatus configured for picking up at least two first packages from the row, superimposing each of said first packages on a respective second package of the row, and releasing each of the first packages resting on the respective second package, obtaining at least two stacks of packages, each of which comprises at least two mutually superimposed packages, and
- a stabilisation apparatus suitable to stabilise the stacks of packages.

This machine substantially attains the same effects as the previous and corresponding packaging method, in particular the one for obtaining greater productivity with respect to the machines which are currently known for carrying out the same function.

According to an aspect of the invention, the handling apparatus may comprise at least one gripping head suitable to grip the packages from above and displacement members suitable to move said gripping head above the conveyor apparatus.

In this manner, the machine is effectively capable of carrying the steps of picking up, superimposing and releasing the packages in a relatively simple and convenient manner.

Furthermore, by acting on the packages from above, the gripping head is not coupled to the conveyor apparatus, which does not require having specific characteristics for this type of application but it can be freely selected from among several per se conventional alternatives.

According to an aspect of the invention, the conveyor apparatus may for example comprise at least one conveyor plane.

The expression conveyor plane is used to indicate any device suitable to provide a plane for supporting the packages of the row and advance them in a direction parallel to said plane.

For example, a conveyor plane can be a driven roller conveyor or a conveyor belt.

Thanks to this solution, the conveyor apparatus of the machine is rather simple and thus inexpensive.

Furthermore, the use of a conveyor plane makes the packaging machine particularly versatile.

As a matter of fact, packages of different size can be placed and advanced on a conveyor plane, without requiring any particular reconfiguration activity on the conveyor apparatus.

Furthermore, two or more mutually parallel rows of packages can be possibly arranged on a conveyor plane.

This entails that, excluding the operation of the gripping head, the machine of the present invention can also be used for packaging single packages, substantially maintaining the same productivity as when used for forming the stacks.

According to a further aspect of the invention, the conveyor apparatus may comprise a system for grouping the packages of the row into groups, each of which comprises at least two packages that are consecutive and arranged close to each other along an advancement direction.

This system may for example comprise three conveyor planes arranged in succession along the advancement direction, including a first conveyor plane, a third conveyor plane, and a second conveyor plane interposed between the first and the third conveyor plane, and a control system configured to actuate said second conveyor plane alternatingly, or intermittently, between two operating modes, including a first operating mode, in which the second conveyor plane is suitable to advance the packages at a speed lower than that of the first conveyor plane, and a second operating mode, in which the second conveyor plane is suitable to advance the packages at a higher speed with respect to the first operating mode and substantially equal to that of the third conveyor plane.

Thanks to this solution, when the second conveyor plane is in the first operating mode, the packages coming from the first conveyor plane accumulate on the second conveyor plane, mutually approaching each other, and then they are released on the third conveyor plane, one group at a time, each time the second conveyor plane is operated in the second operating mode.

In this case, the handling apparatus can be configured to pick up a group of packages from the third conveyor plane and for superimposing it and releasing it on another group of packages also found on the third conveyor plane.

Alternatively, the system for grouping the packages could comprise a stop element and a control system configured to alternatingly, or intermittently, displace, said stop element between an engagement position, in which it provides an obstacle which opposes the advancement of the packages on the conveyor plane, and a disengagement position, in which it removes said obstacle allowing the packages to advance on the conveyor plane.

Thanks to this solution, when the stop element is in the engagement position, the packages conveyed by the conveyor plane accumulate against the same, mutually approaching each other, before being released, one group at a time, each time the stop element is displaced in disengagement position.

In this case, the handling apparatus could be configured to pick up a group of packages from a section of the conveyor plane arranged downstream of the stop element (with respect to the advancement direction) and for superimposing it and releasing it on another group of packages also located on said section of the conveyor plane.

In both cases outlined above, the handling apparatus is however effectively capable of obtaining at least two stacks of packages arranged close to each other along the advancement direction and each comprising at least two mutually stacked packages.

According to another aspect of the invention, the conveyor apparatus may thus also comprise a system for moving the stacks of packages away from each other along the advancement direction.

This system may for example comprise a first conveyor plane, at least one second conveyor plane arranged downstream of the first conveyor plane with respect to the advancement direction, and a control system configured for controlling said second conveyor plane to advance the stacks of packages at a greater speed with respect to the first conveyor plane.

In this manner, passing from the first conveyor plane to the second conveyor plane, the stacks of packages are effectively moved away from each other along an advancement direction, separating them and thus simplifying their subsequent stabilisation step.

All additional characteristics of the invention described above with reference to the method are deemed obviously applicable to the corresponding packaging machine as well.

BRIEF DESCRIPTION OF THE DRAWINGS

Further characteristics and advantages of the invention will be apparent from reading the following description—provided by way of non-limiting example—with reference to the figures illustrated in the attached drawings.

FIG. 2 is section II-II of FIG. 1.

FIG. 3 is section III-III of FIG. 2.

FIG. 4 is an enlarged detail of FIG. 3.

DETAILED DESCRIPTION

In the attached figures, a machine 100 for packaging packages C is illustrated in its entirety.

Figure 5:
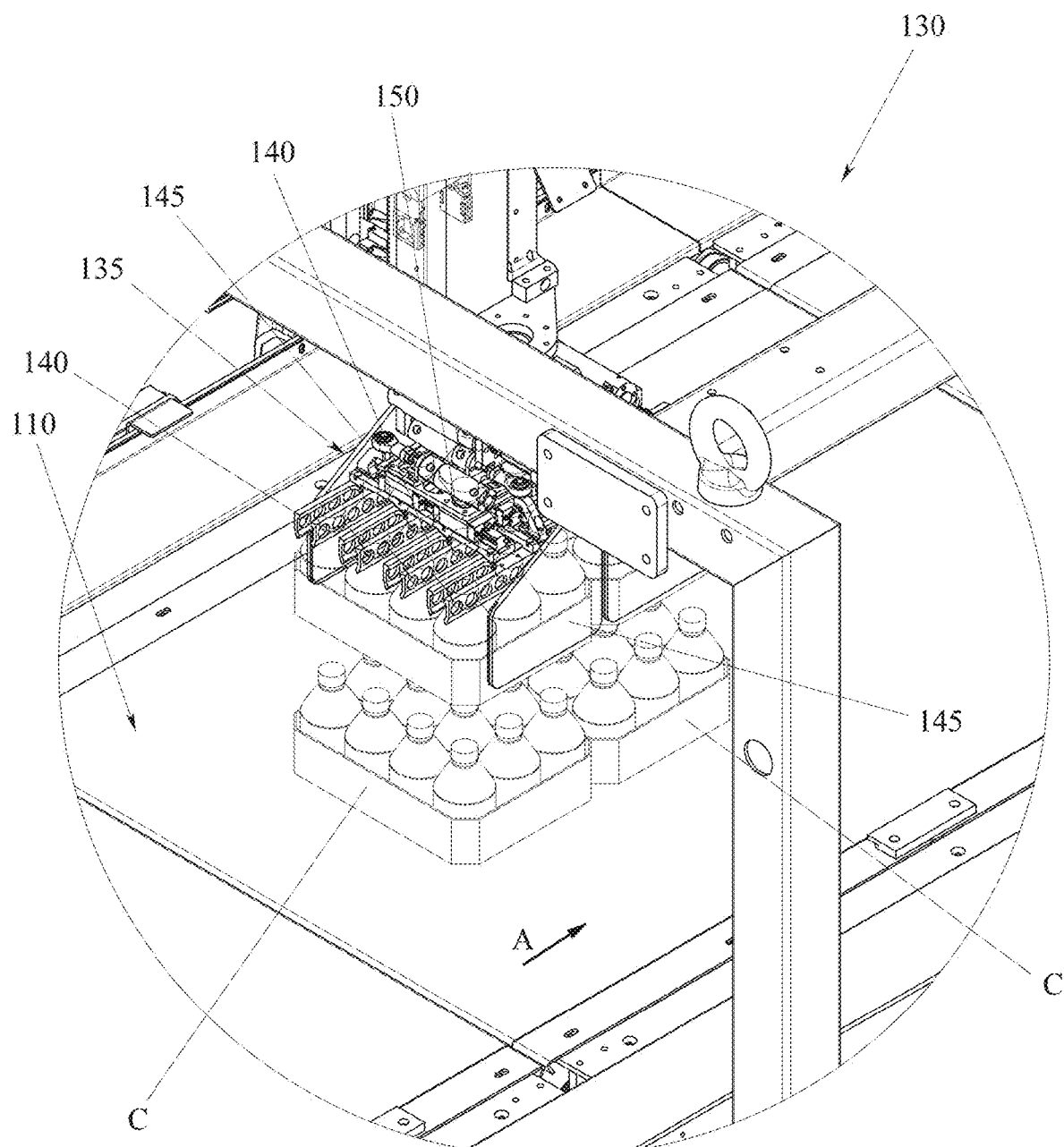
FIG. 5 is a perspective view of the detail of FIG. 4 shown from another angle.

In the illustrated example, each package C comprises a plurality of bottles, typically small bottles, which can be arranged in an orderly manner in the containment tray adjacent and coplanar with respect to each other, so as to form a relatively wide and thin substantially parallelepiped-shaped package (see FIG. 5).

However, it cannot be ruled out that, in other embodiments, the packages C can be different. For example, the containment tray could also be absent or it can be replaced by a simple containment perimeter strip. In addition, it is possible that the objects contained in the packages C are not bottles but other products.

In any case, the machine 100 above all comprises a conveyor apparatus, indicated in its entirety with 105, which is suitable to advance a row of packages C, one after the other, along a pre-set advancement direction A.

Preferably, the conveyor apparatus 105 comprises at least one conveyor plane 110.

The expression conveyor plane is generally used to indicate any device suitable to provide a support plane, preferably horizontal, for the packages C of the row and advance them in an advancement direction A parallel to said support plane.

In the illustrated example, the conveyor plane 110 is a conveyor belt, or a device comprising a flexible belt that is wound on a plurality of idler rollers, at least one of which is driven, in a manner such to be able to slide in a closed path comprising at least one operative section, preferably horizontal and facing upwards, defining the plane for placing and advancing the packages C.

However, it cannot be ruled out that, in other embodiments, the conveyor plane 110 can be a driven roller conveyor or any other device suitable to carry out the aforementioned function.

According to a preferred aspect of the machine 100, the conveyor apparatus 105 may also comprise a system 115 suitable to group the packages C, so that, on the conveyor plane 110, said packages C advance by groups, where each group comprises a plurality of consecutive packages C, in the example two consecutive packages C, which are arranged close to each other along the advancement direction A.

The expression consecutive is used to indicate that the packages C are arranged directly one following the other along the advancement direction A, without any other package C being present in interposed position between them.

The expression arranged close to each other is used to indicate that, with respect to the advancement direction A, the distance that separates two consecutive packages C belonging to the same group is smaller than the distance that separates two consecutive groups, i.e. the distance that separates the last package C of a group and the first package of the immediately subsequent group.

In particular, the packages C belonging to the same group can be at mutual contact and each group can be separated from the subsequent one in the advancement direction A by a non-zero distance.

It should be observed that, in the illustrated example, the conveyor plane 110 has a relatively small extension in the advancement direction A, hence it is capable of supporting and advance only two consecutive groups of packages C.

However, it cannot be ruled out that, in other embodiments, the extension of the conveyor plane 110 in the advancement direction A can be greater, thus making it suitable to support and advance a greater number of groups of packages C.

Going back to the system 115 to group the packages C, this system may comprise further conveyor planes, which are arranged in succession with respect to each other along the advancement direction A and they are configured to convey the packages C on the conveyor plane 110.

Also these further conveyor planes can be provided singularly by a conveyor belt, by a driven roller conveyor or by any other device suitable to define a support plane for the packages C and advance them in a direction parallel to such support plane.

In particular, said further conveyor planes may comprise a first conveyor plane 120, positioned upstream of the conveyor plane 110 with respect to the advancement direction A, and a second conveyor plane 125 interposed between the first conveyor plane 120 and the conveyor plane 110 (which becomes the third of the series).

Preferably, the conveyor planes 110, 120 and 125 are all coplanar to each other and arranged in succession to advance the packages in the same advancement direction A.

The conveyor planes 110, 120 and 125 may be actuated by means of independent drive means.

In this manner, by suitably adjusting the speed and/or operating cycles of the conveyor planes 110, 120 and 125 it is possible to group the packages C as outlined previously.

For example, the first conveyor plane 120 can be actuated in a substantially continuous manner, with the aim of advancing a sequence of packages C, singularly separated from each other and suitably spaced, towards the second conveyor plane 125.

The advancement speed of the first conveyor plane 120 may be substantially equal to the advancement speed of the conveyor plane 110.

At the same time, the second conveyor plane 125 can be actuated alternatingly, or intermittently, between two different operating modes.

In a first operating mode, the second conveyor plane 125 can be actuated so as to advance the packages C at a lower speed with respect to the first conveyor plane 120.

In the second operating mode, the second conveyor plane 125 can be actuated so as to advance the packages C at a greater speed with respect to that of the first operating mode and substantially equal to the speed of the conveyor plane 110.

In this manner, when the second conveyor plane 125 is in the first operating mode, due to reduction of speed, the packages C coming from the first conveyor plane 120 accumulate on the second conveyor plane 125, mutually approaching each other up to possibly coming into contact.

When a number of packages C sufficient to form a group accumulates on the second conveyor plane 125, two consecutive packages C in the example, the second conveyor plane 125 is actuated in the second operating mode, so that said group of packages C is transferred to the conveyor plane 110.

After the transfer, the second conveyor plane 125 is returned to the first operating mode and the cycle is repeated, so that single groups of packages C suitably spaced from each other are progressively released on the conveyor plane 110.

This type of operation can be managed by a control system, typically of the electronic type, which can be connected to the actuation members (e.g. electric motors) of the various conveyor planes.

Alternatively, to what has been described above, the system 115 for grouping the packages C could simply comprise a stop element, for example a transversal edge, which is alternatingly moveable between an engagement position and a disengagement position.

This stop element could be positioned for example at the entrance of the conveyor plane 110, possibly replacing the second conveyor plane 125.

When in the engagement position, the stop element can be suitable to obtain an obstacle which opposes the advancement of the packages C on the conveyor plane 110.

In this manner, the packages C coming from the first conveyor plane 120 accumulate against the stop element, mutually approaching each other up to possibly coming to contact.

When a number of packages C sufficient to form a group has accumulated against the stop element, two consecutive packages C in the example, the stop element could be displaced in a disengagement position, in which it removes the aforementioned obstacle thus allowing the group of packages C to advance on the conveyor plane 110.

Once the group of packages C climbs onto the conveyor plane 110, the stop element could be returned to the engagement position and the cycle could be repeated, so that single groups of packages C mutually spaced from each other are progressively released onto the conveyor plane 110.

Even in this case, the operation of the stop element could be managed by a control system, typically of the electronic type, connected with the members for actuating the stop element.

Irrespective of these observations, the machine 100 also comprises a handling apparatus, indicated in its entirety with 130, which is suitable to pick up (e.g. lift) a first group of packages C from the conveyor plane 110, in this case a pair of packages C, to superimpose said first group of packages C on a second group of packages C also located on the conveyor plane 110, and to release the first group of packages C resting on the second group of packages C.

In particular, the handling apparatus 130 is suitable to pick up, superimpose and release the packages of the first group simultaneously, or at the same time or jointly.

Preferably, the second group of containers C is arranged behind the first group of packages C (i.e. it follows it) with respect to the advancement direction A of the same on the conveyor plane 110.

However, it cannot be ruled out that, in other embodiments, the second group of containers C can be arranged further ahead than the first group of packages C with respect to the advancement direction A.

In any case, following the action of the handling apparatus 130, each package C of the first group rests above a respective package C of the second group, generally forming a stack of packages C mutually superimposed with respect to each other.

In particular, it should be observed that, given that the handling apparatus 130 is suitable to operate with entire groups of packages C, after each pick-up, superimposition and release sequence, it is advantageously possible to obtain a number of stacks of packages C equal to the number of packages of each group, two stacks of packages C at a time in the example.

Downstream of the conveyor plane 110, with respect to the advancement direction A, the conveyor apparatus 105 may comprise a system 180 for moving the stacks of packages C that were obtained previously away from each other.

This system may comprise a further conveyor plane 185 arranged downstream of the conveyor plane 110 with respect to the advancement direction A.

In the illustrated example, this further conveyor plane 185 is a conveyor belt but, in other embodiments, it could be replaced by a driven roller conveyor or by any other device suitable to define a support plane for the packages C and advance them.

Preferably, the conveyor plane 185 is coplanar to the conveyor plane 110 and configured to advance the packages in the same advancement direction A.

The conveyor plane 185 can be actuated by means of an independent drive means with respect to the conveyor plane 110.

In particular, the conveyor plane 185 may be actuated in a substantially continuous manner and at a greater advancement speed with respect to that of the conveyor plane 110.

In this manner, passing from the conveyor plane 110 to the conveyor plane 185, the stacks of packages C are effectively moved away from each other along the advancement direction A.

Even in this case, the operation of the conveyor plane 185 may be managed by the control system of the machine 100.

In the illustrated example, the system 180 also comprises another conveyor plane 187, which is arranged downstream of the conveyor plane 185, with respect to the advancement direction A, and it is actuated at a greater advancement speed than the previous one.

Thanks to this solution, the distance between the stacks of packages C can be effectively increased progressively by suitably adjusting the speeds of the conveyor planes 185 and 187.

Returning to the handling apparatus 130, this apparatus may comprise a gripping head 135 suitable to grip the first group of packages C acting from above, i.e. gripping parts of the packages C found above the conveyor plane 110

In other words, the gripping head 135 is not configured for lifting the packages C pushing them downwards, for example by acting on the lower surfaces with which the packages C rest on the conveyor plane 110, but it rather suitable to lift the packages C pulling them upwards, after gripping them at the portions that are arranged higher than the conveyor plane 110.

In this manner, the operation of the gripping head 135 does not require any type of interaction with the conveyor plane 110, which can be extremely simple.

Getting further into detail, the gripping head 135 may for example comprise a plurality of grippers 140 (see FIGS. 4 and 5), which are generally suitable to grip the neck of all bottles that form the packages C of the group to be picked up.

Each of these grippers 140 may comprise two clamps substantially shaped as bars extending parallel to the advancement direction A.

An interspace suitable to receive the neck of an entire row of bottles belonging to all packages C that form the group to be picked is defined between these two clamps, whose cross-section can be suitably shaped.

Each gripper 140 further comprises suitable actuation members, preferably of the pneumatic type, which are suitable to move the clamps approaching and moving apart from each other, so as to respectively grip and release the neck of the bottles of the corresponding row.

In the illustrated example, the group of packages C consists of two consecutive C packages which generally comprise twenty-four bottles arranged on four rows parallel to the advancement direction A, where each row comprises six bottles.

In this case, the gripping head 135 thus comprises four grippers 140, each of which is suitable to grip the neck of the six bottles belonging to the respective row.

However, it is clear that, should the number and/or size of the bottles of each package C be different, the number and size of the grippers 140 could also be changed.

The gripping head 135 may further comprise two mutually juxtaposed lateral bands 145 which are preferably oriented so as to be parallel to the advancement direction A and substantially orthogonal to the conveyor plane 110.

These lateral bands 145 are arranged outside the grippers 140 and they have a greater vertical extension with respect to the latter, so as to be positioned on opposite sides of the group of packages C, preferably facing the side of the trays containing the bottles.

Even these lateral bands 145 can be associated to actuation members, preferably of the pneumatic type, which are suitable to approach them and mutually move them apart from each other, so as to tighten and respectively release the trays of the group of packages C.

The grippers 140, the possible lateral bands 145 and the relative actuation members, may be installed on a support framework 150 of the gripping head 135, which can in turn be associated to displacement members, indicated in their entirety with 155, which are suitable to move the gripping head 135 above the conveyor plane 110, so as to be able to carry out the operations described previously.

In the illustrated example, the displacement members 155 can be similar to a cartesian coordinate robot.

Figure 1:
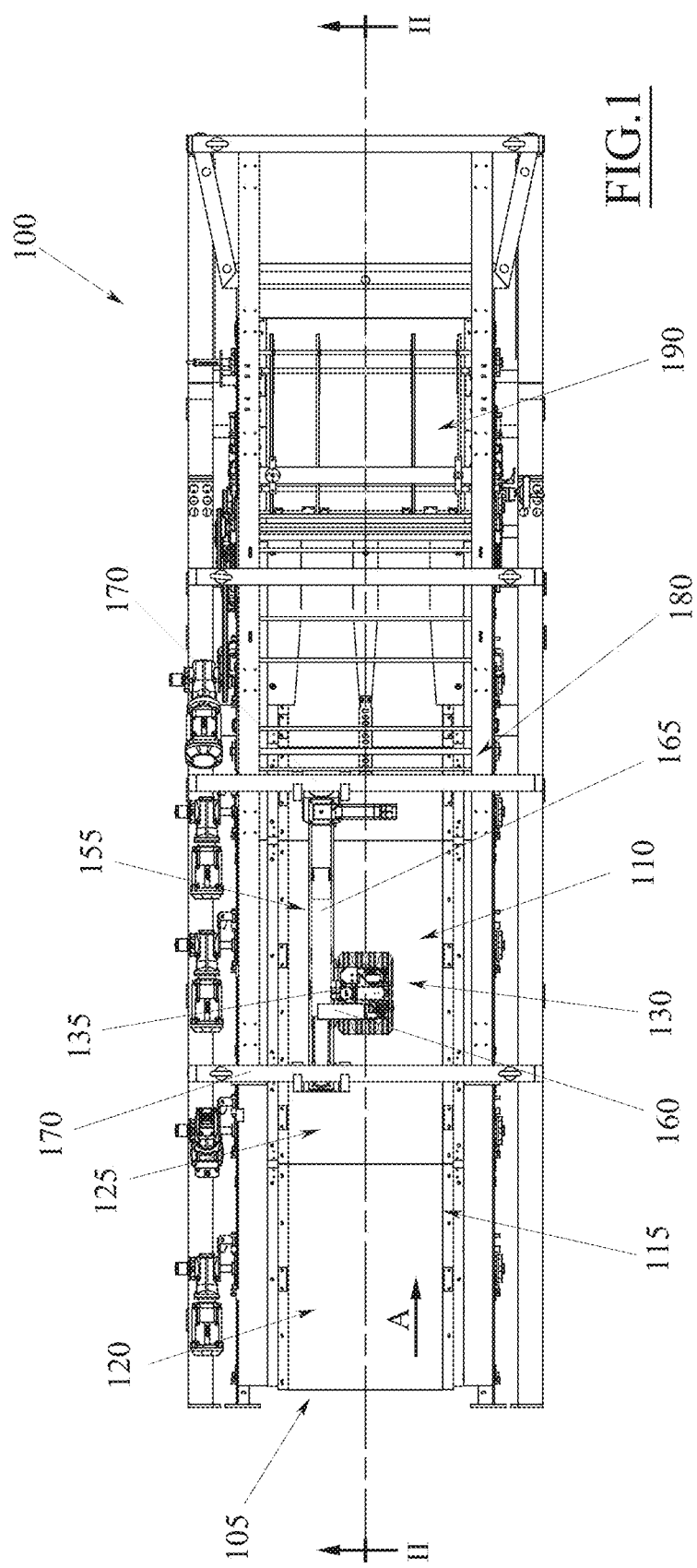
FIG. 1 is a top view of a machine according to an embodiment of the present invention.

In particular, they may comprise a carriage 160 (see FIGS. 1 and 2), which is slidably associated to a longitudinal guide 165 which extends above the conveyor plane 110 in the direction parallel to the advancement direction A.

The longitudinal guide 165 is supported by a pair of crosspieces 170, on which it can slide, alongside the carriage 160, in the direction parallel to the conveyor plane 110 but orthogonal to the advancement direction A.

Lastly, an arm 175, which is moveable with respect to the carriage 160 in the direction orthogonal to the conveyor plane 110 and at whose lower end there is fixed the support framework 150 of the gripping head 135, can be slidably associated to the carriage 160.

The sliding of the longitudinal guide 165 along the crosspieces 170, the sliding of the carriage 160 along the longitudinal guide 165 and the sliding of the arm 175 on the carriage 160, can be actuated using suitable actuator members (e.g. motors), which are preferably slaved to the control system of the machine 100.

However, it should be observed that, alternatively to what has been described above, the displacement members 155 of the gripping head 135 could comprise any other known system suitable to carry out the same function, such as for example an anthropomorphic robot.

Lastly, the machine 100 comprises a stabilisation apparatus, indicated in its entirety with 190, which is suitable to receive the stacks of packages C from the conveyor plane 110, possibly after the same have passed through moving-apart system 180, to stabilise them.

The expression stabilisation is generally used to indicate the fact of mutually blocking the previously stacked packages C, obtaining a packaging that can be handled as a single block.

Preferably, the stabilisation apparatus 190 is suitable to stabilise each stack of packages individually.

In other words, the stabilisation apparatus 190 is suitable to mutually block the packages C of each stack, but maintaining them separate from the packages C of the other stacks, so as to obtain a plurality of independent packagings, each of which contain only one stack of packages C.

For example, the stabilisation apparatus 190 may be configured to at least partially wrap each stack of packages C with a plastic film, for example an extensible and/or heat-shrinkable plastic film, so as to obtain a stabilising cover that holds together, and possibly protects, the packages C of the stack.

Alternatively, the stabilisation apparatus 190 could be suitable to wrap around each stack of packages a strap or tape, or however apply any means capable of constraining and blocking the packages C of the stack to each other thereon.

In the attached figures, the stabilisation apparatus 190 is not illustrated in detail given that it can be per se conventional and widely known to a man skilled in the art.

Though it is preferable that the stacks of packages C be stabilised individually, it cannot be ruled out that, in other embodiments, the stabilisation apparatus 190 can be configured to stabilise various stacks of packages C together, thus obtaining larger packagings and each comprising multiple stacks joined together.

With particular reference to figured 6 to 12, below is a brief summary of the overall operation of the machine 100, which can be obviously operated and managed entirely automatically by the previously mentioned control system.

The packages C advance in a row along the advancement direction A at the input of the machine 100.

Using the grouping system 115, the packages C can be preliminarily grouped so that they advance in groups on the conveyor plane 110.

Each group may comprise two packages C that are consecutive and preferably arranged at mutual contact, and it is separated from the other groups along the advancement direction A by a non-zero distance.

Figure 6:
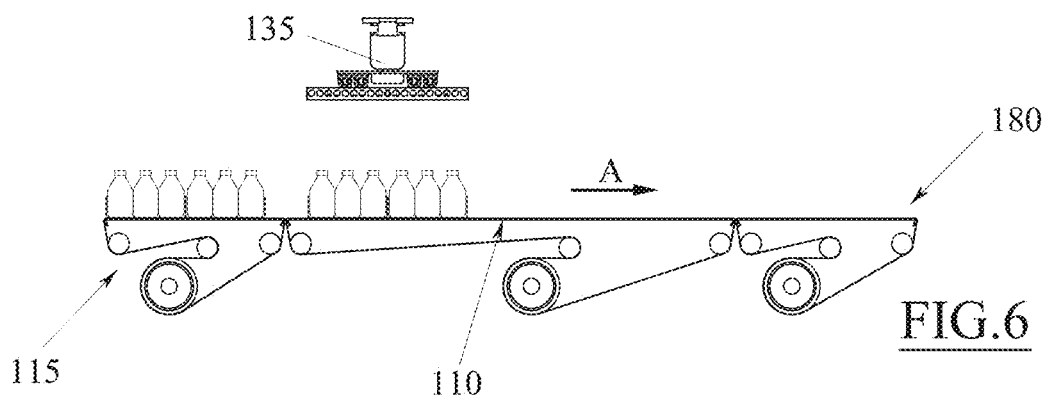
FIGS. 6 to 12 show a gripping head of the machine of FIG. 1 during an equal number of operating steps.

The gripping head 135 lies vertically aligned above a first group of packages C found on the conveyor plane 110 (see FIG. 6).

Figure 7:
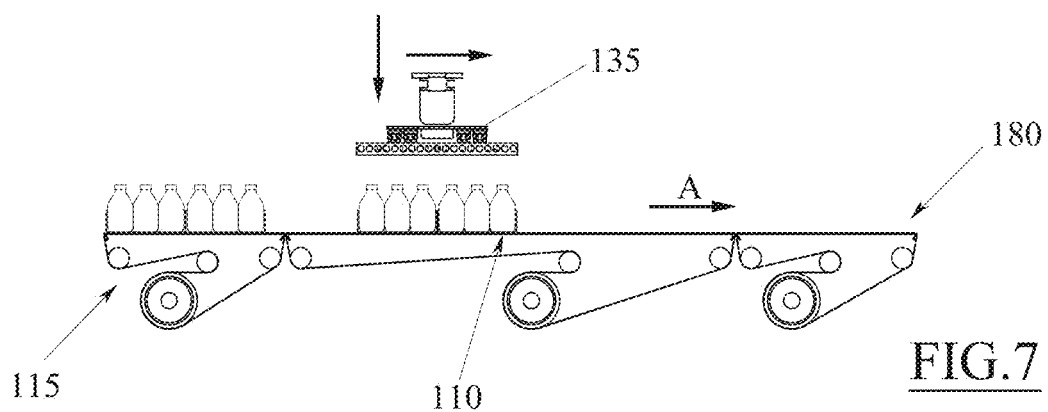
Figure 8:
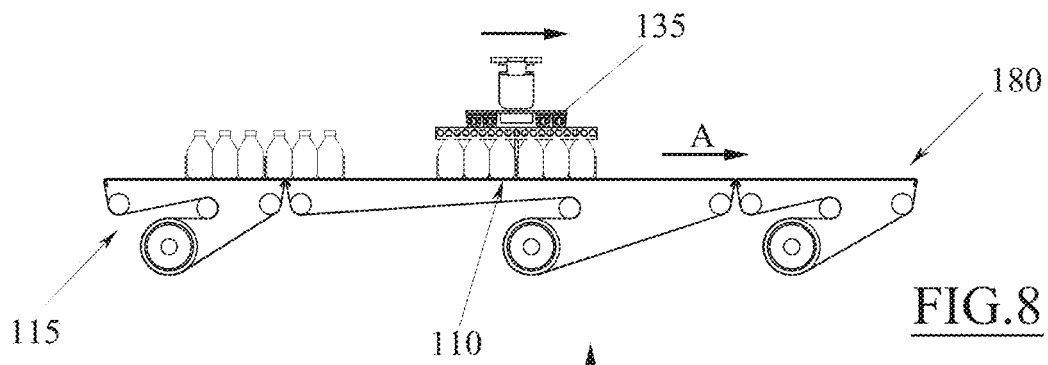

At this point, the gripping head 135 can maintain this alignment, simultaneously sliding in the direction parallel to the advancement direction A, at the same speed and in the same direction as the group of packages C on the conveyor plane 110. Remaining vertically aligned with respect to the first group of packages C, the gripping head 135 can be lowered, so that the grippers 140 and the lateral bands 145 can grip the first group of packages C (FIGS. 7 and 8).

Figure 9:
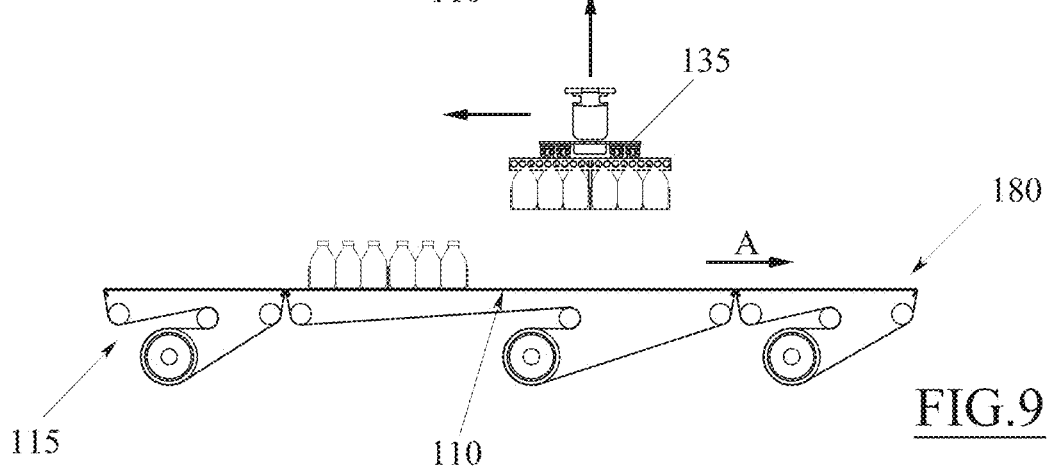
Figure 10:
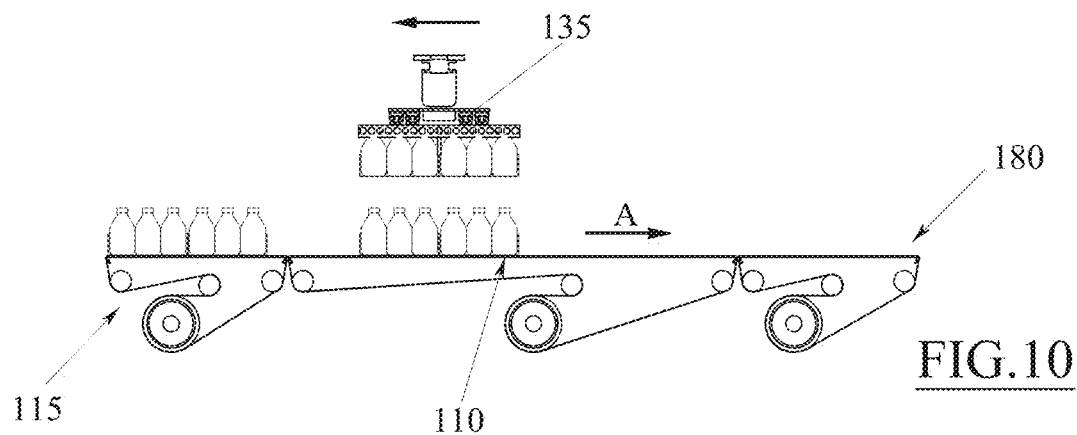

Subsequently, the gripping head 135 can be displaced upwards (FIG. 9), lifting the first group of packages C from the conveyor plane 110 and subsequently positioning it vertically above a second group of packages C found on the conveyor plane 110 (FIG. 10).

Given that the second group of packages C is preferably arranged behind the first group of packages with respect to the advancement direction A, during this superimposition step, the gripping head 135 can be receded in the opposite direction with respect to the advancement direction A.

Once the first group of packages C is vertically aligned with the second group, the gripping head 135 may be once again made to slide at the same speed and in the same direction as the conveyor plane 110, so as to maintain the alignment.

Figure 11:
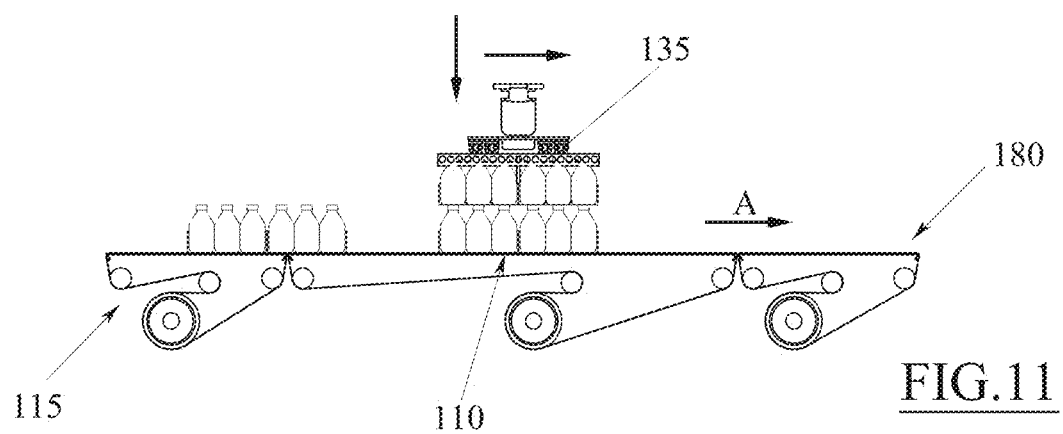

During this alignment period, the gripping head 135 can be lowered (FIG. 11), so as to rest the first group of packages C on the second group and thus form two stacks of packages C, each of which comprises two mutually superimposed packages C.

Figure 12:
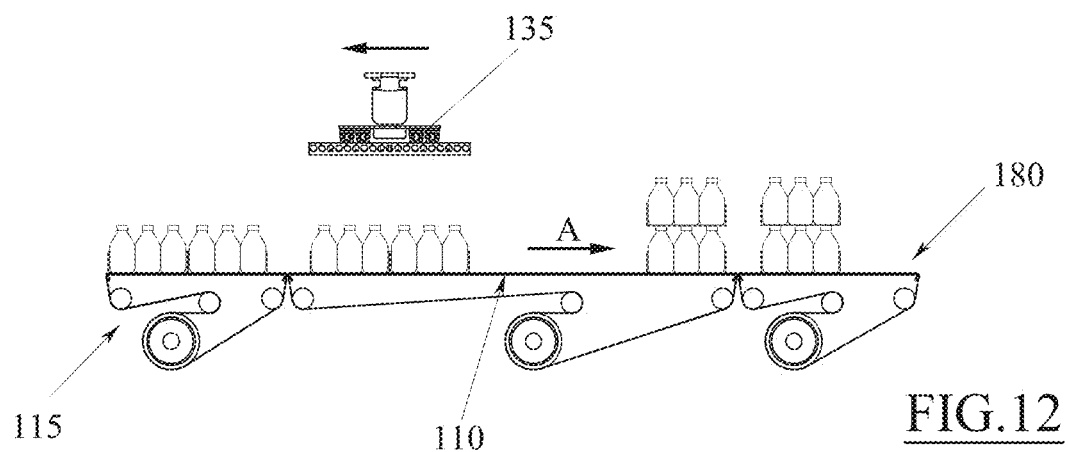

At this point, the grippers 140 and the lateral bands 145 can be opened, so as to release the first group of packages C, and the gripping head 135 can be returned to the initial position to identically repeat the stacking cycle with other two groups of packages C (see FIG. 12).

In the meanwhile, the two stacks of packages C obtained previously can be mutually moved apart by means of the system 180, and then supplied to the stabilisation apparatus 190 where they are stabilised.

Obviously, the operation of the machine 100 is repeated continuously, obtaining—in output—a substantially uninterrupted flow of packagings each containing at least one stack formed by at least two mutually superimposed packages C.

It should be observed that, due to its construction characteristics, the machine 100 is extremely versatile.

In particular, due to the use of simple conveyor planes, the machine 100 can be used for packaging different sizes of packages, without requiring any particular changes or reconfiguration on the conveyor apparatus 105.

Furthermore, the conveyor apparatus 105 is suitable to advance two or more rows of packages C arranged mutually parallel to each other towards the stabilisation apparatus 190.

Thus, excluding the operation of the gripping head 135, the machine 100 could possibly be used for packaging single packages C (i.e. not stacked), substantially maintaining the same productivity as the operation with stacking.

Obviously, the machine 100 and the relative operating method may be subjected—by a man skilled in the art—to numerous technical/application modifications, without departing from the scope of protection of the invention as claimed below.

The invention claimed is:

1. A method for packaging packages, comprising the steps of:
    forming a row of packages advancing, one following the other, along a pre-set advancement direction,
    picking up at least two first packages from the row,
    superimposing each of said first packages on a respective second package of the row,
    releasing each of the first packages resting on the respective second package, obtaining at least two stacks of packages, each of which comprises at least two mutually superimposed packages, and
    stabilizing the stacks of packages,
    wherein the superimposing step includes receding the at least two first packages in an opposite direction with respect to the advancement direction.

2. A method according to claim 1, wherein the first packages and the second packages are consecutive with respect to each other.

3. A method according to claim 1, wherein the steps for superimposing and releasing the first packages occur while the second packages advance in the advancement direction.

4. A method according to claim 1, comprising the steps of grouping the packages of the rows into groups, wherein each group comprises at least two packages that are consecutive and arranged close to each other along the advancement direction.

5. A method according to claim 4, comprising the step of separating the stacks of packages moving them way from each other along the advancement direction.

6. A method according to claim 1, wherein the stabilization step provides for at least partially wrapping the stacks of packages with a plastic film.

7. A machine for packaging packages, comprising:
    a conveyor apparatus suitable to advance a row of packages, one after the other, along a pre-set advancement direction,
    a handling apparatus configured to pick up at least two first packages from the row, superimpose each of said first packages on a respective second package of the row by receding the at least two first packages in the opposite direction with respect to the advancement direction, and release each of the first packages resting on the respective second package, obtaining at least two stacks of packages, each of which comprises at least mutually superimposed two packages, and
    a stabilization apparatus suitable to stabilize the stacks of packages.

8. A machine according to claim 7, wherein the handling apparatus comprises at least one gripping head suitable to grip the packages from above and displacement members suitable to move said gripping head above the conveyor apparatus.

9. A machine according to claim 7, wherein the conveyor apparatus comprises at least one conveyor plane.

10. A machine according to claim 7, wherein the conveyor apparatus comprises a system for grouping the packages of the row into groups, each of which comprises at least two packages that are consecutive and arranged close to each other along the advancement direction.

11. A machine according to claim 10, wherein the conveyor apparatus comprises a system for moving the stacks of packages away from each other along the advancement direction.

* * * * *